United States Patent [19]

Thompson

[11] Patent Number: 5,636,668

[45] Date of Patent: Jun. 10, 1997

[54] HEAT EXCHANGER FOR FUEL FILLER PIPE FOR ON-BOARD FUEL VAPOR RECOVERY

[75] Inventor: Robert H. Thompson, Redford, Mich.

[73] Assignee: Ford Motor Company, Dearborn, Mich.

[21] Appl. No.: 498,497

[22] Filed: Jul. 5, 1995

[51] Int. Cl.⁶ .................................................. B67D 5/00
[52] U.S. Cl. ........................... 141/82; 141/59; 220/86.2; 220/746; 62/3.61; 62/48.2; 62/54.1; 123/41.31
[58] Field of Search .......................... 141/11, 44, 45, 141/59, 82; 62/3.6, 3.61, 48.2, 54.1; 220/86.1, 86.2, 746; 123/41.2, 41.31

[56] References Cited

U.S. PATENT DOCUMENTS

| | | | |
|---|---|---|---|
| 3,477,238 | 11/1969 | Race | 62/3 |
| 3,791,422 | 2/1974 | Johnson et al. | 141/11 |
| 3,921,412 | 11/1975 | Heath et al. | 62/54 |
| 3,960,207 | 6/1976 | Boer | 165/104 R |
| 3,994,322 | 11/1976 | Overall | 141/46 |
| 4,286,551 | 9/1981 | Blitz | 123/41.31 |
| 4,453,503 | 6/1984 | Freeburn | 123/41.31 |
| 4,572,394 | 2/1986 | Tanahashi et al. | 220/86 R |
| 4,930,317 | 6/1990 | Klein | 62/3.3 |
| 5,220,954 | 6/1993 | Longardner et al. | 165/10 |
| 5,255,520 | 10/1993 | O'Geary et al. | 62/3.2 |
| 5,409,500 | 4/1995 | Dyrek | 607/111 |

*Primary Examiner*—J. Casimer Jacyna
*Attorney, Agent, or Firm*—Kim Scott; Roger L. May

[57] ABSTRACT

A fuel vapor recovery system is disclosed wherein fuel supplied to the fuel filler pipe of a vehicle is cooled by a container of a coolable phase change material. The phase change material is cooled by a thermoelectric cooling element powered by the vehicle electrical system. A heat exchange member is disposed in the filler pipe in heat conducting relation to the container containing the phase change material. The heat exchanger and container are preferably retained in the filler pipe by thermally insulative supporting members to minimize heat transfer between the container phase change material and the filler pipe.

5 Claims, 1 Drawing Sheet

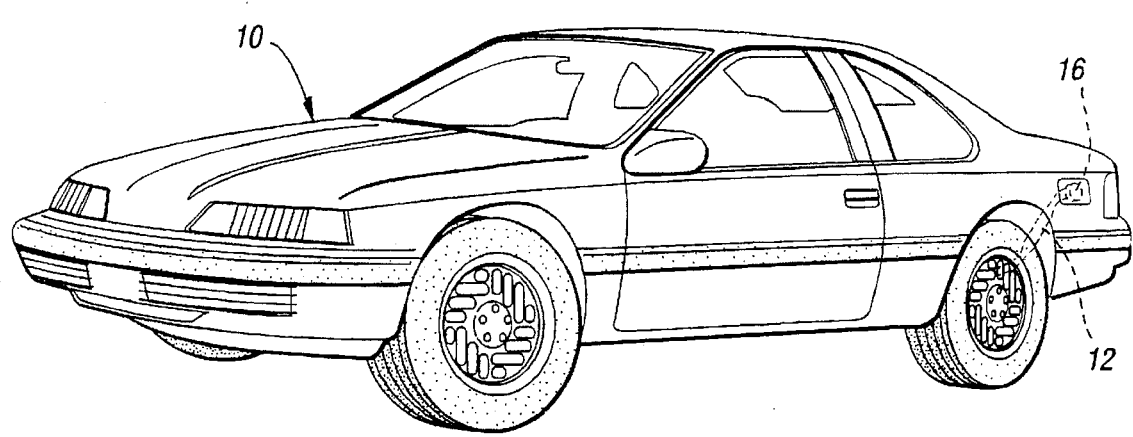
Fig. 1
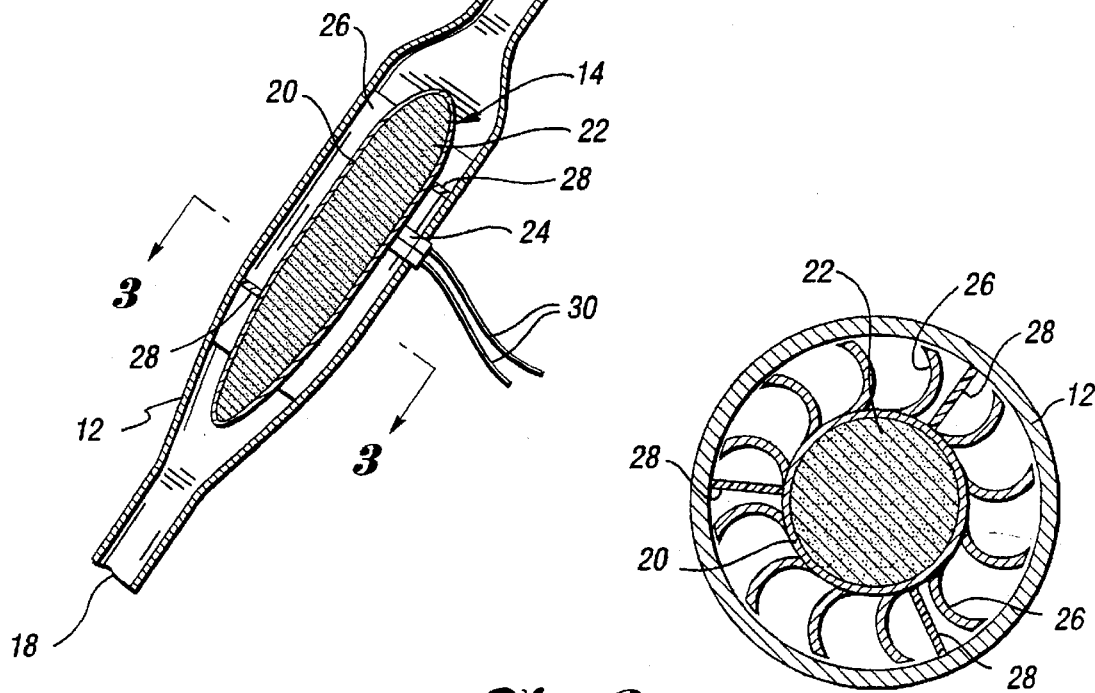
Fig. 2
Fig. 3

HEAT EXCHANGER FOR FUEL FILLER PIPE FOR ON-BOARD FUEL VAPOR RECOVERY

TECHNICAL FIELD

This invention relates to the field of reducing fuel vapor emission during refueling of vehicles.

BACKGROUND ART

Vehicles are refueled by dispensing fuel from underground storage tanks into a vehicle fuel tank. A small but measurable amount of fuel vapor is emitted during refueling due to the displacement of vapors from the vehicle fuel tank and release of vapors due to turbulently dispensing fuel from the refilling nozzle into the fuel filler pipe. The amount of vapor emissions varies in part based upon the temperature of the fuel dispensed into the fuel tank and the temperature of fuel within the fuel tank. The temperature of fuel obtained from underground storage tanks is approximately 65°–70° F. Temperature of fuel within the fuel tank which is heated by warm air flowing underneath the car from the engine and vehicle cooling systems can exceed 80° F. The warmer the fuel the more volatile and greater the quantity of vapor emissions can be expected during refueling.

Prior art attempts to overcome the problem of vapor recovery during refueling have generally focused on adaptation of fuel dispensing nozzles to include vapor recovery systems. In particular, U.S. Pat. No. 3,921,412 to Heath et al. discloses a refrigeration system for fuel dispensing nozzles which condense vapors emitted from a fuel filler pipe.

Recently, environmental regulations requiring reduction of emissions during refueling have been promulgated that will necessitate on-board systems for reducing vapor emission during refueling. One approach to meeting these requirements is to provide a carbon canister at the inlet of the fuel filler pipe as proposed in U.S. Pat. No. 4,572,394 to Tanahashi et al. Carbon canister systems are expensive and add weight to vehicles which is counterproductive to fuel efficiency requirements.

The above problems have failed to provide a solution as proposed in the present invention as summarized below.

SUMMARY OF THE INVENTION

According to the present invention, a refueling fuel vapor emission reduction system for a motor vehicle is provided wherein a fuel filler pipe extending from the exterior of the vehicle to the fuel tank is provided with a container for a phase change material. The phase change material is cooled by a cooling apparatus which cools the phase change material. A heat exchanger is disposed in the fuel filler pipe in a heat conducting relationship to the container containing the phase change material. Fuel deposited in the fuel tank through the fuel filler pipe is cooled as it contacts the heat exchange member to reduce the volatility of the fuel and thereby minimize emission of fuel vapor during refueling.

According to another aspect of the invention, the cooling apparatus used to cool the phase change material is a thermoelectric cooling element or heat pump. The thermoelectric cooling element preferably continuously cools the phase change material to maintain the phase change material in its solid state prior to refueling. The thermoelectric cooling element would be controlled to operate at full power when the vehicle is running and at a lower level when the vehicle engine is not running.

According to another aspect of the invention, the phase change material in the container is propylene glycol or ethylene glycol which is cooled to a solid state and then changes to a liquid state when warmed by the flow of fuel into the vehicle fuel tank during refueling.

According to yet another aspect of the present invention, the heat exchange member which conducts heat from the flow of fuel into the vehicle tank to the phase change material includes a plurality of fins radiating from the container toward the filler pipe. The fins terminate in a spaced relationship relative to the fuel filler pipe. The heat exchanger and container are retained in the fuel filler pipe by insulative plastic support members that facilitate maintaining the phase change material in a cooled state without unnecessarily cooling the fuel filler pipe.

A primary advantage of the present invention is that it permits reduction of emissions during refueling with an on-board system without the use of additional expensive carbon canister fuel vapor recovery systems.

BRIEF DESCRIPTION OF THE DRAWINGS

FIG. 1 is a perspective view of a vehicle showing the fuel filler pipe;

FIG. 2 is a diagrammatic longitudinal cross-section of a fuel filler pipe having the refueling vapor emission cooling system of the present invention; and FIG. 3 is a cross-sectional view taken along the line 3—3 in FIG. 2 showing the fuel filler pipe, container for phase change material, and heat exchanger fins made in accordance with the present invention.

DETAILED DESCRIPTION OF THE PREFERRED EMBODIMENT

Referring now to FIG. 1, a vehicle 10 having a fuel filler pipe 12 suitable for use with the refueling fuel vapor emission reduction system 14 of the present invention which is shown in FIGS. 2 and 3.

Referring now to FIGS. 2 and 3, the filler pipe 12 houses the refueling fuel vapor emission reduction system, generally indicated by arrow 14, between the inlet end 16 and the fuel tank end 18 of the filler pipe 12. The refueling fuel vapor emission reduction system 14 includes a container 20 which contains a phase change material 22. Phase change material 22 is cooled by a thermoelectric cooling element 24.

Fins 26 are provided to facilitate heat exchange between the phase change material 22 and fuel being dispensed into the filler pipe 12 as it flows from the inlet end 16 to the fuel tank end 18. The fins are preferably shaped to maximize heat exchange as the fuel flows across the fins 26. The container 20 and fins 26 are preferably retained in the filler pipe 12 by means of supports 28. Supports 28 are formed of a thermally-insulative material such as an acetal plastic.

The thermoelectric cooling element 24 is connected by means of electrical wires 30 to a heat dissipation portion of a thermoelectric cooling system. Examples of thermoelectric heating and cooling systems which could be adapted for use in the present invention include U.S. Pat. No. 5,255,520 and 4,930,317, both of which are hereby incorporated by reference.

The container 20 and fins 26 are preferably formed of stainless steel to resist corrosion. Alternatively, steel or another metal could be used to make either or both of the container 20 or fins 26.

Fins 26 preferably are spaced from the wall of the filler pipe 12 so that the fins are not in direct heat conduction communication with the walls of the filler pipe 12.

The thermoelectric cooling element 24 preferably operates on a continuous basis to keep the phase change material in its cooled solid state. The thermoelectric cooling element would preferably be capable of providing continuous cooling with a full power mode when the engine is running and a trickle mode when the engine is off.

The phase change material is preferably ethylene glycol or propylene glycol gel. An example of an appropriate gel would be a mixture consisting essentially of deionized water and propylene glycol in a ratio of approximately 3:1 by weight.

In operation, as fuel is dispensed through the inlet end 16 of the filler pipe 12, it flows across the fins 26 which are maintained at a lower temperature by virtue of their contact with the container 20 for the phase change material 22. As the fuel passes over the fins 26, the fuel is cooled while the phase change material 22 converts from its solid to its liquid state within the container 20. This cooling of the fuel reduces volatility and causes fuel vapors emitted from the fuel tank to be condensed as the cooler liquid passes through the filler pipe 12. In this way, emissions occurring during refueling of a vehicle are minimized or potentially eliminated.

In between refueling operations, the thermoelectric cooling element 24 cools the phase change material 22 within the container 20 to its solid state. The thermoelectric cooling element 24 is preferably thermally controlled to minimize the need for cooling once the phase change material reaches its solid state. Additional control of the thermoelectric cooling element 24 could provide for a dual mode of operation wherein during normal engine operation, the power provided to the thermoelectric cooling element could be maximized. When the engine is off and power for the thermoelectric cooling element 24 would be drawn from the vehicle battery, a trickle of power would be provided to the thermoelectric cooling element to minimize drain on the vehicle battery.

The above description is of a preferred embodiment of the present invention which is intended to provide an enabling description of the present invention. The broad scope of the present invention should be construed by reference to the following broad claims.

What is claimed is:

1. A refueling fuel vapor emission reduction system for a motor vehicle comprising:

a fuel filler pipe extending from an inlet end accessible from an exterior portion of a vehicle and a fuel tank end disposed within a fuel tank of a vehicle;

a container containing a phase change material disposed within the fuel filler pipe, said phase change material in the container being propylene glycol gel;

a cooling apparatus cooling the phase change material;

a heat exchange member disposed in the fuel filler pipe between the inlet end and fuel tank end thereof in heat conducting relation to the container containing the phase change material; and wherein fuel deposited in the fuel tank through the fuel filler pipe is cooled as it contacts the heat exchange member to reduce the volatility of the fuel and thereby minimize emission of fuel vapor during refueling.

2. The fuel vapor reduction system of claim 1 wherein the cooling apparatus is a thermoelectric cooling element.

3. A refueling fuel vapor emission reduction system for a motor vehicle comprising:

a fuel filler pipe extending from an inlet end accessible from an exterior portion of a vehicle and a fuel tank end disposed within a fuel tank of a vehicle;

a container containing a phase change material disposed within the fuel filler pipe;

a cooling apparatus cooling the phase change material;

a heat exchange member disposed in the fuel filler pipe between the inlet end and fuel tank end thereof in heat conducting relation to the container containing the phase change material, said heat exchange member having a plurality of fins radiating from the container toward the filler pipe; and wherein fuel deposited in the fuel tank through the fuel filler pipe is cooled as it contacts the heat exchange member to reduce the volatility of the fuel and thereby minimize emission of fuel vapor during refueling.

4. The fuel vapor reduction system of claim 3 wherein the plurality of fins do not contact the filler pipe.

5. The fuel vapor reduction system of claim 3 wherein the container is supported by thermally insulative supports.

* * * * *